United States Patent
Sinnhuber

[11] Patent Number: 6,158,765
[45] Date of Patent: Dec. 12, 2000

[54] OCCUPANT PROTECTION DEVICE FOR A MOTOR VEHICLE

[75] Inventor: Ruprecht Sinnhuber, Gifhorn, Germany

[73] Assignee: Volkswagen AG, Wolfsburg, Germany

[21] Appl. No.: 09/146,593

[22] Filed: Sep. 3, 1998

[30] Foreign Application Priority Data

Sep. 5, 1997 [DE] Germany ............ 197 38 842

[51] Int. Cl.$^7$ .................................. B60R 21/20
[52] U.S. Cl. .................. 280/728.3; 280/729; 280/732
[58] Field of Search ................... 280/729, 730.1, 280/728.3, 732, 743.2

[56] References Cited

U.S. PATENT DOCUMENTS

| | | | |
|---|---|---|---|
| 3,642,303 | 2/1972 | Irish et al. ........................ | 280/150 |
| 3,768,830 | 10/1973 | Haas ............................... | 280/150 |
| 3,884,497 | 5/1975 | Massengill ...................... | 280/730.1 |
| 4,043,572 | 8/1977 | Hattori et al. .................. | 280/729 X |
| 4,169,613 | 10/1979 | Barnett ........................... | 280/729 |
| 4,262,931 | 4/1981 | Strasser et al. ................. | 280/730.1 |
| 4,300,894 | 11/1981 | Cumming et al. ............... | 493/210 |
| 4,773,673 | 9/1988 | Sakurai .......................... | 280/732 |
| 5,275,456 | 1/1994 | Ishii et al. . | |
| 5,280,947 | 1/1994 | Cooper ........................... | 280/728 |
| 5,306,043 | 4/1994 | Mihm et al. ................... | 280/743.2 X |
| 5,427,410 | 6/1995 | Shiota et al. ................... | 280/729 X |
| 5,431,433 | 7/1995 | Steimke et al. ................. | 280/728.3 |
| 5,482,319 | 1/1996 | Yoshimura et al. . | |
| 5,513,877 | 5/1996 | MacBrien et al. .............. | 280/743.2 X |
| 5,577,765 | 11/1996 | Takeda et al. .................. | 280/729 |
| 5,730,464 | 3/1998 | Hill ................................ | 280/730.2 X |
| 5,775,729 | 7/1998 | Schneider et al. .............. | 280/730.1 |
| 5,927,748 | 7/1999 | O'Driscoll ...................... | 280/729 |

FOREIGN PATENT DOCUMENTS

| | | |
|---|---|---|
| 2174607 | 10/1993 | Canada . |
| 0483366 | 5/1992 | European Pat. Off. . |
| 0593172 | 4/1994 | European Pat. Off. . |
| 0769428 | 4/1997 | European Pat. Off. . |
| 2109637 | 9/1972 | Germany . |
| 3743415 | 6/1988 | Germany . |
| 4028715 | 10/1991 | Germany . |
| 92114210 | 3/1993 | Germany . |
| 4217177 | 11/1993 | Germany . |
| 4231522 | 3/1994 | Germany . |
| 4442543 | 1/1996 | Germany . |
| 29517372 | 3/1996 | Germany . |
| 19531667 | 10/1996 | Germany . |
| 19538657 | 4/1997 | Germany . |
| 29700804 | 5/1997 | Germany . |
| 29707162 | 7/1997 | Germany . |
| 29713111 | 3/1998 | Germany . |
| 0132444 | 5/1989 | Japan ............................. 280/729 |
| 3281460 | 12/1991 | Japan . |
| 2265118 | 9/1993 | United Kingdom ............ 280/729 |
| 9316902 | 9/1993 | WIPO . |
| 9625309 | 8/1996 | WIPO . |

*Primary Examiner*—Lanna Mai
*Attorney, Agent, or Firm*—Baker Botts L.L.P.

[57] ABSTRACT

An occupant protection device for a motor vehicle has at least one inflatable airbag which, upon activation of at least one associated gas generator passes through, leaves an exit opening in the region in front of an occupant and enters the interior of the motor vehicle. The airbag has a multi-chambered design and has at least one inflatable thorax-protection gas chamber and a head-protection gas chamber, which is connected to the said thorax-protection gas chamber by gas-throughflow openings and, with the airbag inflated, lies above the thorax-protection gas chamber, the thorax-protection gas chamber is preceded by a smaller inflatable gas prechamber, which is in connection with the gas generator and can be inflated directly by the latter. The gas prechamber is connected to the thorax-protection gas chamber of gas-throughflow openings, so that the thorax-protection gas chamber can be inflated indirectly by the gas generator via the gas prechamber.

7 Claims, 3 Drawing Sheets

OCCUPANT PROTECTION DEVICE FOR A MOTOR VEHICLE

BACKGROUND OF THE INVENTION

The invention relates to an occupant protection device for a motor vehicle having at least one inflatable airbag.

In the case of a generic occupant protection device for a motor vehicle, as described in Canadian Patent Application No. 2,106,347, use is made of an inflatable airbag which, upon activation of at least one associated gas generator, leaves an exit opening in the region in front of an occupant and enters the interior of the motor vehicle. This airbag contains two chambers, a lower thorax-protection gas chamber being inflatable by the gas generator. Arranged above the thorax-protection gas chamber, with a common intermediate wall, is a head-protection gas chamber, the intermediate wall being provided with gas-throughflow openings, through which the head-protection gas chamber can be inflated via the thorax-protection gas chamber.

Following the activation of the gas chamber, a gas jet is directed straight at the occupant, so that, immediately after leaving the exit opening, the airbag shoots towards the occupant with undesirably vigorous aggressiveness before the thorax-protection gas chamber unfolds and the head-protection gas chamber is then also inflated via the gas-throughflow openings. The completely inflated airbag has a balloon-like shape, so that there is a bead-like bulge also in the region where impact is made with the neck. As a result, it is not possible to rule out the possibility of the airbag moving under the chin of the occupant, in particular at its connection between the thorax-protection gas chamber and the head-protection gas chamber directed at the occupant, and of the head of the occupant then being accelerated backwards, counter to the direction of impact, with severe stressing of the cervical spine.

In the case of another known occupant protection device for a motor vehicle having an inflatable airbag in the region in front of an occupant, described in German Gebrauchsmuster No. 297 00 804 the said airbag is unsymmetrically shaped in the inflated state, in such a way that there is a greater volume in the head-impact region than in the thorax-impact region. Reference is generally made to the possibility of subdividing such an airbag into a plurality of chambers to be inflated, although nothing specific is stated in this respect. Here too, an initial gas jet is directed from the gas generator at the occupant with undesired aggressiveness.

Also known is a side-impact occupant protection device for a motor vehicle, described in German Offenlegungsschrift No. 195 38 657, in which an airbag with a thorax-protection gas chamber and a head-protection gas chamber adjoining the latter leaves an exit opening in a backrest. Here, the gas jet from the assigned gas generator is directed in the longitudinal direction of the vehicle, so that in the case of such a side airbag the problem of high aggressiveness due to a gas jet directed at the occupant does not occur.

It is also known to arrange a gas diffuser downstream of a gas generator, as described in International Published Application No. 9625309, with which diffuser the radiating direction of the gas can be influenced and a gas jet directed at an occupant can be divided into different directions. Such a diffuser is an additional component, which requires an installation space and which increases the weight of the vehicle. In most cases such a diffuser cannot be used for an additional function.

SUMMARY OF THE INVENTION

The object of the invention is to improve an occupant protection device of the generic type to the extent that, while having a simple design and a highly protective function, the aggressiveness of an airbag is reduced.

This object is achieved by providing an occuput protection device in which the thorax-protection gas chamber is preceded by a smaller inflatable gas prechamber, which is in connection with the gas generator and can be inflated directly by the latter. The gas prechamber is connected to the thorax-protection gas chamber by gas-throughflow openings, so that the thorax-protection gas chamber can be inflated indirectly by the gas generator via the gas prechamber.

This achieves the effect that the gas jet from the gas generator is not directed straight at the occupant, but passes via the deflecting gas-throughflow openings from the gas prechamber into the thorax-protection gas chamber. As a result, the aggressiveness of the airbag due to undesirably vigorous striking of an occupant is reduced. There is no need for an additional diffuser part.

It is preferred in this case if, in the inflated state of the airbag, the gas prechamber lies in the lower region against the thorax-protection gas chamber, without any supporting function for an occupant, so that a gas jet directed straight into the gas prechamber does not cause any contact with an occupant. The at least two gas-throughflow openings in this case lie in a lateral upper region of the gas prechamber with respect to the thorax-protection gas chamber. This represents a favourable arrangement of the gas-throughflow openings for the avoidance of a gas jet directed axially at the occupant.

In a way known per se, the exit opening for the airbag is closed by a panel or cover when the airbag is not activated. It is advantageous if, here, upon activation of the gas generator, the first increase in volume of the gas prechamber can be used in an additional function for removal of the panel or cover.

This function is particularly suitable in the case of an exit opening in a dashboard with a continuous, jointless dashboard cover and a tear-open cover. In this case, behind the tear-open cover there is arranged a tear-open lever, which can be swivelled downwards, is secured up against the rear side of the tear-open cover and, upon activation of the gas generator by the inflatable prechamber, is swivelled downwards and thereby tears open the tear-open cover.

With suitable shaping of the tear-open cover, for example as an angle lever, the effect is achieved that, following airbag activation and removal of the exit-opening cover, no solid cover parts are projected in an uncontrolled manner in the direction of an occupant, since the tear-open lever is still held in the swivel bearing and only relatively soft and compliant parts of the dashboard cover protrude from the surface of the dashboard. Altogether, the possibility of injury on the exit opening or from cover parts is reduced as a result.

In a further development, it is proposed that at least two gas-throughflow openings respectively lie in a lateral upper region of the thorax-protection gas chamber with respect to the head-protection gas chamber. The head-protection gas chamber has a U-bead shape which adjoins the thorax-protection gas chamber upwards, essentially in a transverse plane of the vehicle. The U-leg ends in this case point downwards and are connected in the region of the lateral gas-throughflow openings to the thorax-protection gas chamber. In the case of this design, the airbag, in particular the head-protection gas chamber, does not have in the neck-impact region of an occupant any neck bead which could pass under the chin of an occupant coming into forceful contact, with the risk of cervical injuries. This design measure of the airbag also reduces its aggressiveness, with a specific influence brought to bear on the kinematics of the occupant.

In the event of oblique impact, there is the risk that an occupant coming into contact with an activated airbag slides off to the side, thereby reducing the protective function of the airbag. Therefore, in a preferred development of the head-protection gas chamber, it is proposed that the beads of the U-legs are drawn upwards and thickened in the region of the U-base in comparison with the latter, as a protection against sliding off in the event of oblique impact.

Depending on the circumstances, it may be advantageous to use a second or two-stage gas generator which, for a second, time-delayed inflating operation, is connected to the thorax-protection gas chamber or a further thorax-protection gas chamber. Such a second inflating operation may be advantageous for improved support in the event of very heavy impact and/or in the case of a very heavy occupant and/or an "out of position" situation. These boundary conditions for the triggering of a second inflating operation can be detected by devices known per se, such as impact sensors and/or occupant-identifying devices.

BRIEF DESCRIPTION OF THE DRAWINGS

The invention is explained in more detail with reference to the drawings, in which.

DESCRIPTION OF THE PREFERRED EMBODIMENTS

Figure 1:
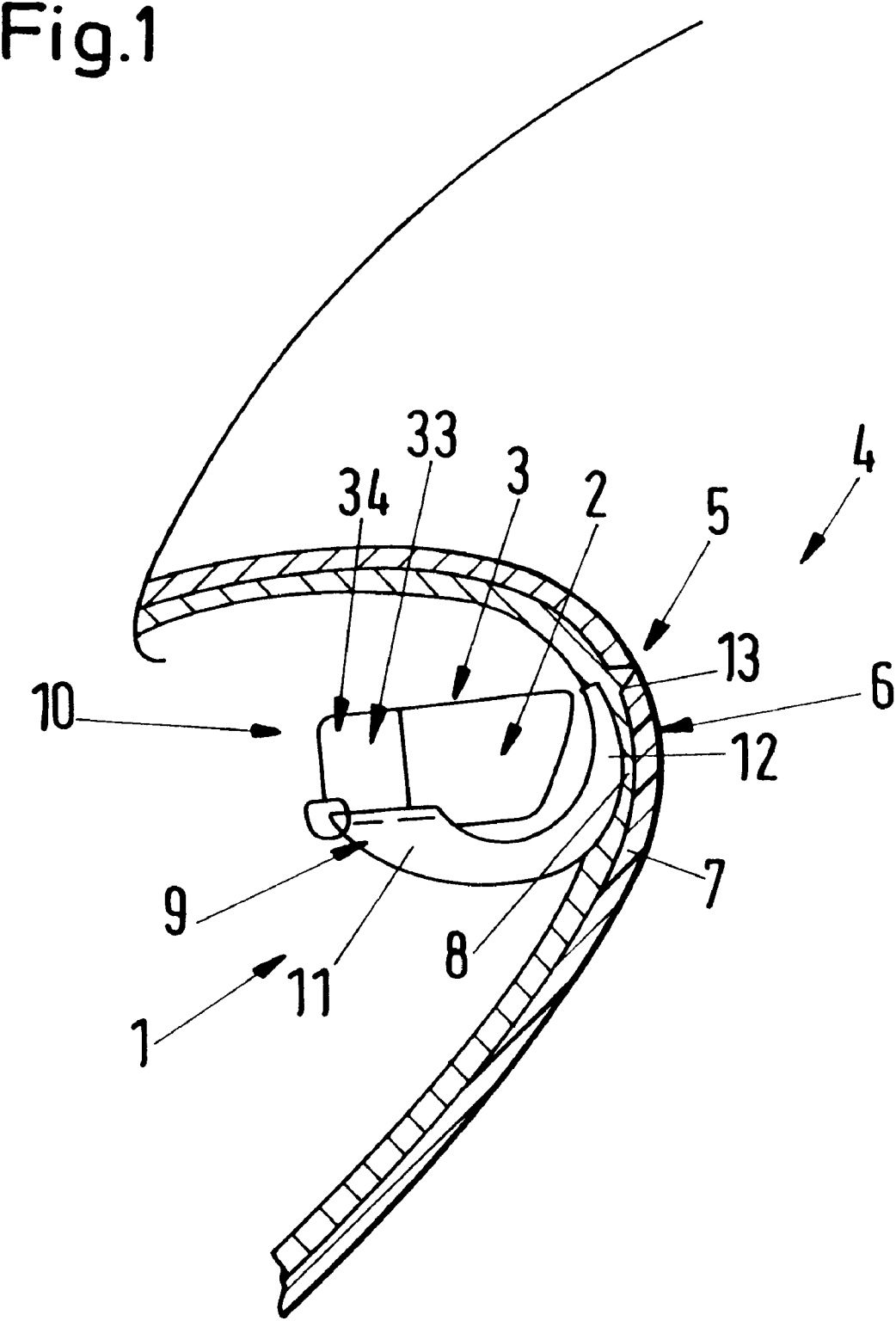
FIG. 1 shows a diagrammatic representation of a dashboard cover with a tear-open cover.

In FIG. 1, an occupant protection arrangement 1 for a motor vehicle is diagrammatically represented. This occupant protection device 1 has an airbag arrangement 3 with a multi-chambered airbag 2, which can be activated by means of first and second gas generators 33 and 34. In the event of activation, the airbag 2 passes through an exit opening, which can be formed in a dashboard 5 and is in the region in front of an occupant, into the interior 4 of the motor vehicle. The dashboard 5 is composed of a continuous, Pointless dashboard cover 6 with a tear-open cover 7.

Arranged behind the tear-open cover 7 is an arcuate angle lever 9, which can be swivelled downwards, as a tear-open lever. In the position of rest 10, represented in FIG. 1, of the angle lever 9, an approximately horizontal first angle leg 11 is mounted at the end such that it can be swivelled, while a second, approximately vertical angle leg 12 bears against the rear side 8 of the tear-open cover 7. In the region of the free leg end of the second, vertical angle leg 12, there is formed in the dashboard cover 6 a material weakening as a predetermined tear-open edge 13 of the tear-open cover 7.

The structural design of the multi-chambered airbag 2 is explained in more detail below in connection with its four-stage activation on the basis of FIGS. 2 to 6:

In the event of an accident and activation of the occupant protection device 1, in the first stage of airbag activation, firstly a gas prechamber 14 is inflated by means of the first gas generator 33. On account of the increase in volume of the gas prechamber 14, in the way diagrammatically represented in FIG. 3, the angle lever 9 bearing with its vertical angle leg 12 against the tear-open cover 7 is moved downwards out of its position of rest 10, as is indicated by the arrow 15. The angle lever 9 thereby exerts such a large force on the tear-open cover 7 that the dashboard cover 6 tears in the region of the predetermined tear-open edge 13 and the tear-open cover 7 is likewise moved downwards. As a result, an exit opening for the airbag 2 is formed in the dashboard cover 6, in the interior 4 of the motor vehicle in the region in front of an occupant 16. The gas prechamber 14 for this case does not perform any supporting function for the occupant 16.

Figure 2:
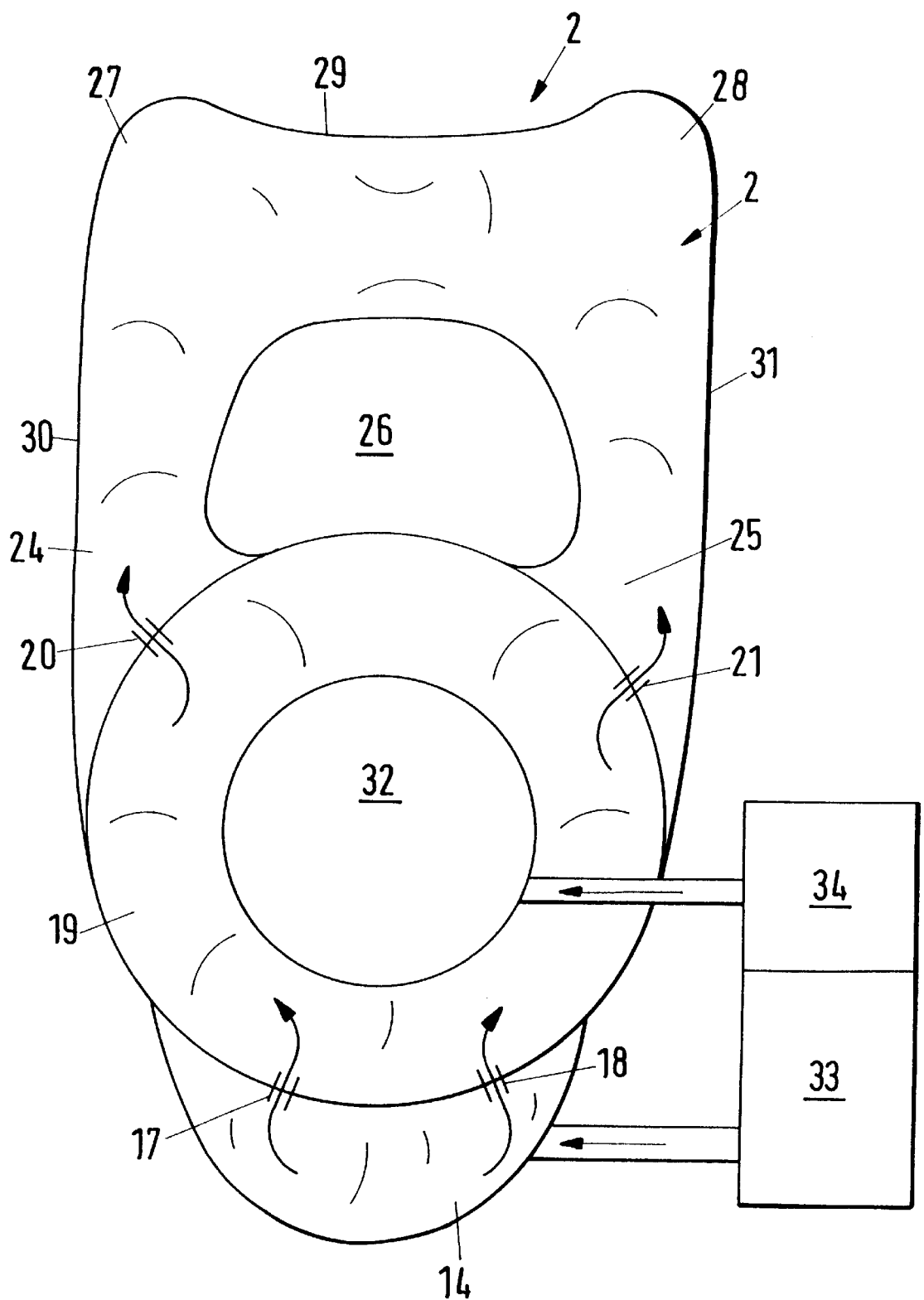
FIG. 2 shows a diagrammatic representation of an inflated multi-chambered airbag.
Figure 3:
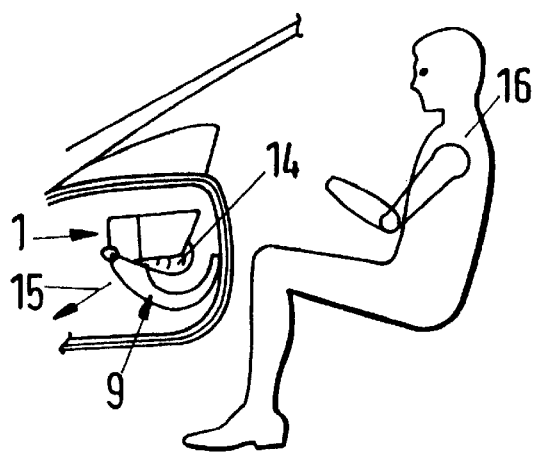
FIG. 3 shows a diagrammatic representation of a first stage of airbag activation.
Figure 4:
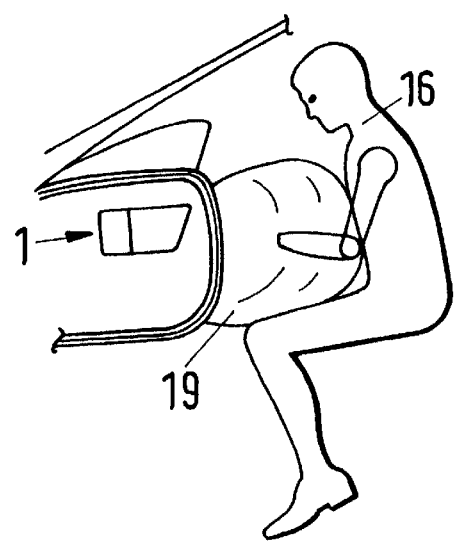
FIG. 4 shows a diagrammatic representation of a second stage of airbag activation.
Figure 5:
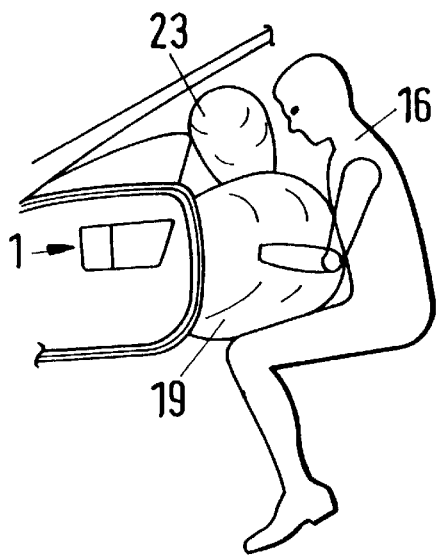
FIG. 5 shows a diagrammatic representation of a third stage of airbag activation.
Figure 6:
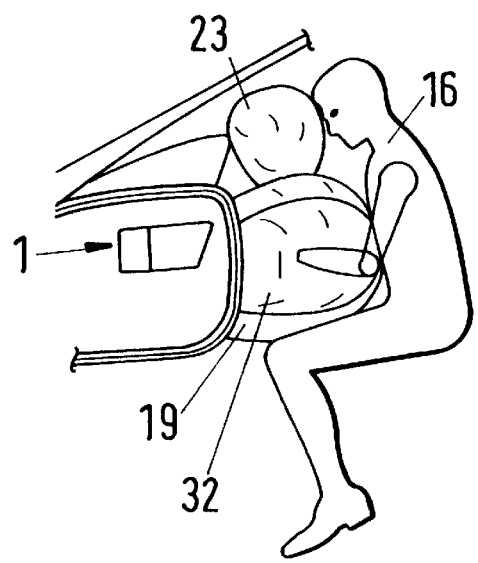
FIG. 6 shows a diagrammatic representation of a fourth stage of airbag activation.

As revealed by the diagrammatic representation of FIG. 2, the gas prechamber 14 precedes a thorax-protection gas chamber 19 of the airbag 2 and is connected to the latter via gas-throughflow openings 17, 18. The two gas-throughflow openings 17, 18 are in this case respectively arranged in a lateral, upper region of the gas prechamber 14 with respect to the thorax-protection gas chamber 19. Consequently, the thorax-protection gas chamber 19 can be inflated indirectly by the first gas generator 33 via the gas prechamber 14. As a result, as diagrammatically represented in FIG. 4, in the second stage of airbag activation, the thorax-protection gas chamber 19 is inflated for thorax protection of the occupant 16, without a gas jet acting directly on the said occupant.

As can be seen from FIG. 2, the thorax-protection gas chamber 19 is connected to a head-protection gas chamber 23, which can be inflated via two gas-throughflow openings 20, 21. These gas-throughflow openings 20, 21 are respectively arranged in a lateral, upper region of the thorax-protection gas chamber 19 with respect to the head-protection gas chamber 23. The head-protection gas chamber 23 is likewise inflated indirectly by the first gas generator 33. As a result, as can be seen from the diagrammatic representation of FIG. 5, in the third stage of airbag activation, the head-protection gas chamber 23 is inflated via the thorax-protection gas chamber 19 for head protection of the occupant 16, likewise without a gas jet acting directly on the said occupant.

As FIG. 2 reveals, the head-protection gas chamber 23 has a U-bead shape, the U-leg ends 24, 25 of which point downwards and are connected to the thorax-protection gas chamber 19 in the region of the lateral gas-throughflow openings 20, 21. As a result, the head-protection gas chamber 23 does not have in the neck-impact region 26 of the occupant 16 any neck bead. Furthermore, in the region of the U-base 29 of the head-protection gas chamber 23, beads 27, 28 of the U-legs 30, 31 are drawn upwards and thickened in comparison with this U-base 29, and thus serve as a protection against sliding off in the event of oblique impact.

In the fourth stage of airbag activation, a second thorax-protection gas chamber 32, which is preferably smaller and is contained in the first thorax-protection gas chamber 19, is inflated by the second gas generator 34 in a second inflating operation with a time delay with respect to the first inflating operation. As represented merely diagrammatically in FIG. 6, this second thorax-protection gas chamber 32 enhances the supporting function of the first thorax-protection gas chamber 19, for example in the event of very heavy impact and/or in the case of a very heavy occupant 16 and/or an "out of position" situation of the occupant 16. The triggering of the second inflating operation in this case takes place, for example, with the aid of impact sensors and/or occupant-identifying devices.

What is claimed is:

1. An occupant protection arrangement for a motor vehicle comprising at least one inflatable airbag and at least one associated gas generator, a cover having an exit opening in the region of the motor vehicle in front of an occupant providing a passage for the airbag to enter the interior of the motor vehicle, the inflatable airbag comprising a plurality of chambers with at least one thorax-protection gas chamber which can be inflated by a gas generator and a head-protection gas chamber which is connected to the thorax-protection gas chamber by gas-throughflow openings and which, with the airbag inflated, lies above the thorax-protection gas chamber, the thorax-protection gas chamber being preceded by a smaller inflatable gas prechamber which is connected to the gas generator and can be inflated directly by the gas generator and wherein the gas prechamber is connected to the thorax-protection gas chamber by gas-throughflow openings so that the thorax protection gas chamber can be inflated indirectly by the gas generator through the gas prechamber and wherein the exit opening is closed by the cover when the airbag is not activated and wherein, upon activation of the gas generator, the gas prechamber, is inflated first and assists in removal of the cover and wherein the exit opening is provided in a dashboard having a continuous, jointless dashboard cover and a tear-open cover, including a tear-open lever behind the tear-open cover which can be swivelled downwardly, the tear-open lever being retained against the rear side of the tear-open cover and, upon activation of the gas generator by the inflatable prechamber, is swivelled downwardly and thereby tears open the tear-open cover.

2. An occupant protection arrangement according to claim 1 wherein in the inflated state of the inflatable airbag, the gas prechamber, lies in the lower region against the thorax-protection gas chamber without any supporting function for an occupant and wherein at least two gas-throughflow openings are provided in a lateral upper region of the gas prechamber with respect to the thorax-protection gas chamber.

3. An occupant protection arrangement according to claim 1 wherein the tear-open lever has an arcuate form with an approximately horizontal first leg and an approximately vertical second leg in normal position, the approximately horizontal first leg being mounted at one end so that it can be swivelled and the second approximately vertical leg engaging the rear side of the tear-open cover and the dashboard cover having, in the region of the end of the second, approximately vertical leg, a material weakening providing a predetermined tear-open edge of the tear-open cover.

4. An occupant protection arrangement according to claim 1 or claim 3 including at least two gas-throughflow openings in a lateral upper region of the thorax-protection gas chamber with respect to the head-protection gas chamber, and wherein the head-protection gas chamber has a U-shape, which adjoins the thorax-protecting gas chamber essentially in a transverse plane of the vehicle, and wherein the U-leg ends of the head protection gas chamber point downwardly and are connected in the region of the lateral gas-throughflow openings to the thorax-protection gas chamber so that the head-protection gas chamber does not have any neck bead in the neck-impact region of an occupant.

5. An occupant protection arrangement according to claim 4, wherein the beads of the U-legs extend upwardly and are thickened in the region of the U-base in comparison with the U-legs as a protection against sliding off in the event of oblique impact.

6. An occupant protection arrangement according to claim 1 including a second gas generator connected to the thorax-protection gas chamber which can be activated with a time delay with respect to the first inflating operation and enhances the supporting function of the thorax-protection gas chamber by a second inflating operation.

7. An occupant protection arrangement according to claim 6 including a second thorax-protection gas chamber for the second inflating operation which is smaller than and is contained in the first thorax-protection gas chamber.

* * * * *